US006833414B2

(12) United States Patent
Granel et al.

(10) Patent No.: US 6,833,414 B2
(45) Date of Patent: Dec. 21, 2004

(54) CROSS-LINKABLE AQUEOUS FLUOROPOLYMER BASED DISPERSIONS CONTAINING SILANES

(75) Inventors: Claude C. Granel, Philadelphia, PA (US); Lotfi Hedhli, King of Prussia, PA (US); Ramin Amin-Sanayei, King of Prussia, PA (US); Kurt A. Wood, Abington, PA (US)

(73) Assignee: Arkema Inc., Philadelphia, PA (US)

( * ) Notice: Subject to any disclaimer, the term of this patent is extended or adjusted under 35 U.S.C. 154(b) by 0 days.

(21) Appl. No.: 10/074,333

(22) Filed: Feb. 12, 2002

(65) Prior Publication Data

US 2003/0204018 A1 Oct. 30, 2003

(51) Int. Cl.$^7$ .......................... C08L 83/14; C08G 77/48
(52) U.S. Cl. ...................... 525/479; 525/104; 525/106; 525/276; 525/342; 525/902
(58) Field of Search .................... 528/25, 26, 30, 528/36; 526/279; 524/837, 838; 525/104, 106, 276, 342, 479, 902

(56) References Cited

U.S. PATENT DOCUMENTS

| 2,559,752 A | | 7/1951 | Berry .................... 260/29.6 |
| 3,475,396 A | | 10/1969 | McCain et al. ............ 260/92.1 |
| 3,644,255 A | * | 2/1972 | Thompson ................ 524/188 |
| 4,360,652 A | | 11/1982 | Dohany ................... 526/210 |
| 4,370,376 A | * | 1/1983 | Gangal et al. .............. 55/524 |
| 4,510,282 A | * | 4/1985 | Goll ....................... 524/337 |
| 4,514,537 A | | 4/1985 | Cavanaugh ............... 524/265 |
| 4,526,930 A | | 7/1985 | Keogh ..................... 525/105 |
| 4,579,636 A | | 4/1986 | Inoue et al. ................ 522/99 |
| 4,751,114 A | | 6/1988 | Homma et al. .......... 427/407.1 |
| 4,771,095 A | | 9/1988 | Hanisch et al. ............ 524/437 |
| 4,886,862 A | | 12/1989 | Kuwamura et al. ........ 526/247 |
| 4,946,889 A | * | 8/1990 | Nishioka .................. 524/544 |
| 5,003,008 A | | 3/1991 | Kobayashi ................ 525/104 |
| 5,101,565 A | | 4/1992 | Trankiem ............... 30/346.54 |
| 5,179,181 A | | 1/1993 | Honma et al. ............. 526/216 |
| H001279 H | * | 1/1994 | Stephenson ............... 524/317 |
| 5,349,003 A | | 9/1994 | Kato et al. ................ 524/458 |
| 5,476,522 A | | 12/1995 | Kerr et al. .................. 44/626 |
| 5,589,075 A | | 12/1996 | Sivakumar et al. ........ 210/727 |
| 5,616,753 A | | 4/1997 | Turner et al. .............. 556/401 |
| 5,621,038 A | | 4/1997 | Chen et al. ................ 524/527 |
| 5,646,201 A | | 7/1997 | Araki et al. ............... 523/201 |
| 5,686,523 A | | 11/1997 | Chen et al. ................ 524/547 |
| 5,712,335 A | * | 1/1998 | Tsuda et al. ............... 524/269 |
| 5,827,922 A | * | 10/1998 | Chen et al. ................ 524/837 |
| 5,859,123 A | | 1/1999 | Kobayashi et al. ........ 524/805 |
| 5,973,090 A | | 10/1999 | Maruyama et al. ........ 526/247 |
| 6,353,065 B1 | | 3/2002 | Charleux et al. ........... 526/220 |
| 2003/0045626 A1 | | 3/2003 | Tamori et al. ............. 524/547 |

FOREIGN PATENT DOCUMENTS

| EP | 0 631 999 | 1/1995 | .......... C04B/41/49 |
| EP | 736 583 | 10/1996 | |
| JP | 58065711 | 4/1983 | .......... C08F/14/22 |
| JP | 05170909 | 7/1993 | |
| JP | 06322313 | 11/1994 | |
| JP | 8[1996]-170045 | 7/1996 | ......... C09D/127/16 |
| JP | 8[1996]-259773 | 10/1996 | .......... C08L/51/06 |
| JP | 9[1997]-165490 | 6/1997 | .......... C08L/51/06 |
| WO | WO 95/085582 | 3/1995 | .......... C08F/259/08 |
| WO | WO 96/06887 | 3/1996 | .......... C08L/27/16 |
| WO | WO 97/07155 | 2/1997 | .......... C08G/65/22 |
| WO | WO 97/12936 | 4/1997 | .......... C08L/43/04 |
| WO | WO 97/15624 | 5/1997 | .......... C08L/43/04 |
| WO | WO 98/10724 | 3/1998 | .......... A61F/13/15 |
| WO | WO 98/14489 | 4/1998 | .......... C08F/14/06 |
| WO | WO 98/14516 | 4/1998 | .......... C08L/23/08 |
| WO | WO 98/19798 | 5/1998 | ............ B05F/7/00 |
| WO | WO 98/28307 | 7/1998 | ............ C07F/7/18 |
| WO | WO 01/34670 A1 | 5/2001 | ......... C08F/214/18 |

OTHER PUBLICATIONS

Machine Translation of JP 07–018214 obtained from the JPO Website, Tomonori et al. 01–1995.*
Chen et al. "Coatosil™ 1706 a new Silane Monomer for Crosslinking", OSi Specialties A Witco Company, 1996.
Piotrowski et al. "Silane–Modified Compositions from Vinylidene Fluoride Polymers for Crosslinked Molding", SciFinder Jan. 18, 1999. (Abstract Only).
Buning et al. "Copolymerisation von Vinylchlorid mit Vinyltrialkoxysilanen in waBriger Phase", Mar. 24, 1970, pp. 89–96. (English Abstract).
U.S. patent application No. 09/869,454, filed Jun. 28, 2001.
U.S. patent application No. 09/613,515, filed Jul. 10, 2000.

* cited by examiner

Primary Examiner—Jeffrey B. Robertson
(74) Attorney, Agent, or Firm—Kilyk & Bowersox, P.L.L.C.

(57) ABSTRACT

A cross-linkable fluoropolymer dispersion is described and involves a polymer product of at least one polymerizable acrylic and/or vinyl containing monomer and at least one hydrolytically stable silane containing monomer which are in the presence of an aqueous dispersion of at least one fluoropolymer. The present invention further relates to cross-linkable fluoropolymer blends wherein at least one polymer contains acrylic units, vinyl units, or both and at least one hydrolytically stable silane or silane containing group in the presence of at least one thermoplastic fluoropolymer. The silane or silane containing group can alternatively be present in the thermoplastic fluoropolymer. Methods of making the cross-linkable fluoropolymers are also described as well as products containing the cross-linkable fluoropolymer dispersions such as paints and coatings.

20 Claims, No Drawings

CROSS-LINKABLE AQUEOUS FLUOROPOLYMER BASED DISPERSIONS CONTAINING SILANES

BACKGROUND OF THE INVENTION

The present invention relates to fluoropolymers, and more particularly relates to cross-linkable aqueous fluoropolymer based dispersions which contain silanes. The present invention further relates to cross-linked products.

While there are many high performance fluorine-containing coatings, these coatings generally suffer from a variety of shortcomings. For instance, many fluoropolymer coatings are prepared from solutions or solvent-based dispersions of fluoropolymers and other resins. Many of these coatings, including most coatings based on polyvinylidene fluoride, require high temperature baking for optimal performance. Due to safety and other environmental reasons associated with solvents, water borne coatings in the form of an aqueous dispersion are preferred over solvent-based coatings. Coatings which do not require baking are particularly preferred since they can be used on a wider range of substrates and applied under various conditions. Generally, coating performance is often achieved by having an intimate blend of fluorinated and non-fluorinated polymers or by copolymerizing fluorinated and non-fluorinated monomers. However, for many desirable groups of co-monomers, copolymerization can be difficult if not impossible. Furthermore, producing an intimate homogeneous blend of fluorinated and non-fluorinated resins can be severely limited by polymer incompatibility, particularly when the fluorine content of the coating is high such as over 50% by weight. A lack of homogeneity in the mixing of the resins can greatly reduce the coating performance. Dispersions have been attempted based on chlorine containing monomers along with vinyl containing polymers in order to achieve homogeneous mixing of two polymers. However, the presence of chlorine reduces the level of fluorine in the polymer which adversely affects the weatherability of the resulting film due both to the strength of C—F bonds and the weakness of C—Cl bonds. The presence of chlorine also raises the refractive index of the polymer which is undesirable. Accordingly, a chlorine-free dispersion is highly desirable.

Furthermore, there is a desire to improve the low surface energy of fluoropolymers since the adhesion of coatings to various substrates is often inadequate. Also, there is a desire for water-based dispersions of fluoropolymer resins having good stability during storage and yet producing cross-linked films at room temperature with good clarity and solvent resistance upon application and drying.

Various other attempts to provide aqueous compositions are reported. For instance, U.S. Pat. No. 5,621,038 relates to the preparation of storage stable curable, aqueous compositions by incorporating sterically hindered silane groups into the polymer and using a hydrolytically stable organo metallic catalyst. An external buffer may be used to maintain the pH of the composition between 5.5 and 8.0 to reportedly prevent premature hydrolysis-condensation of the silane groups. However, this patent does not relate to fluoropolymers nor address the storage stability problems with fluoropolymers. U.S. Pat. No. 4,526,930 relates to silane-containing polymers. However, this patent is not directed to fluoropolymers and again does not address the storage stability problems associated with fluoropolymers. Furthermore, in this patent, an organosilane moiety is post-polymerized or grafted to a molten thermoplastic polymer in the presence of a peroxide indicator. The resulting polymer is not considered an aqueous dispersion. JP 05170909 relates to aqueous dispersions prepared by conducting an organosilane condensation reaction in the presence of a fluoropolymer aqueous dispersion. Hydrolytically unstable silanes can be used to create in situ polysiloxane polymers in the aqueous dispersion. EP 736 583 relates to aqueous dispersions containing organosilicon compounds admixed with an aqueous fluoropolymer dispersion. The admixture of the organosilicon compounds to the fluoropolymer dispersion is preferably done after the polymerizations to make the fluoropolymer dispersion. In addition, this patent does not address the need for storage stability with fluoropolymer dispersions to prevent hydrolysis/condensation of the silane functional groups. In U.S. Pat. No. 4,514,537, silane functional materials which are post-added to fluoropolymer dispersions are described. Again, like the patents described above, this patent does not address the need for storage stability by preventing hydrolysis/condensation of the silane functional groups. In unexamined JP 06322313, a silane-containing fluoropolymer dispersion is produced by blending two dispersions. One dispersion contains poly(fluoromonomer-co-vinyl ether) and the other dispersion contains an acrylic polymer with a reactive organosilane group. This essentially is a post-addition of a silane functional polymer to a fluoropolymer. Again, this patent does not address or appreciate achieving storage stability by preventing hydrolysis/condensation of the silane functional groups. All of the patents and publication mentioned above and throughout this patent application form a part of this application and are incorporated herein in their entirety by reference.

Accordingly, there is a need to overcome one or more of the above-described shortcomings with respect to fluoropolymer dispersions.

SUMMARY OF THE INVENTION

Features of the present invention are to provide a storage stable aqueous fluoropolymer dispersion; a cross-linkable fluoropolymer dispersion which is a chlorine-free fluoropolymer; aqueous fluoropolymer dispersions having superior water borne film forming capability and which achieve cross-linking after film formation and which can be accelerated by the use of heat, catalysts, or a change in the pH; water-based paints and coatings using the stable cross-linkable fluoropolymer dispersions; solvent dispersions, powder coatings, or melt-process material derived from cross-linkable fluoropolymer dispersions which are storage stable; and methods to make stable fluoropolymer dispersions.

To achieve these and other advantages and in accordance with the purposes of the present invention, as embodied and broadly described herein, the present invention relates to a cross-linkable fluoropolymer blend which contains a) at least one polymer containing acrylic units, vinyl units, or both, and at least one hydrolytically stable silane or silane containing group; and b) at least one thermoplastic fluoropolymer, wherein a) and b) are different; to a cross-linkable fluoropolymer dispersion containing a polymer product resulting from polymerizing at least one polymerizable acrylic and/or vinyl containing monomer and at least one hydrolytically stable silane monomer in the presence of an aqueous dispersion of at least one fluoropolymer; to cross-linked versions of the above-described fluoropolymer dispersions; to paints and coatings containing the cross-linkable or cross-linked fluoropolymer dispersions of the present invention; to solvent dispersions, powder coatings, or melt-processed material derived from the cross-linkable fluoropolymer dispersions of the present invention which can be obtained after removal of the water from the dispersion; to films or articles made from the aqueous fluoropolymer dispersions of the present invention which preferably have a low refractive index and/or have excellent UV and chemical resistance; and to methods of preparing cross-linkable fluoropolymer dispersions by polymerizing at least one polymerizable acrylic and/or vinyl containing monomer and at least one hydrolytically stable silane monomer in the presence of an aqueous dispersion of at least one fluoropolymer. Alternatively, or in addition, the cross-linkable fluoropolymer dispersion can be prepared by polymerizing at least one polymerizable acrylic and/or vinyl containing monomer in the presence of an aqueous dispersion of at least one fluoropolymer which contains organosilane groups as part of the fluoropolymer.

DETAILED DESCRIPTION OF THE PRESENT INVENTION

The present invention relates to cross-linkable fluoropolymer dispersions having silane or silane containing groups present in the dispersion. The present invention further relates to cross-linked fluoropolymers resulting from the dispersion as well as products, such as films, paints, and coatings, derived from the cross-linkable fluoropolymer dispersions of the present invention. The cross-linkable fluoropolymer dispersions of the present invention can be characterized several ways as described below.

The cross-linkable fluoropolymer dispersions of the present invention include a polymer product resulting from polymerizing at least one polymerizable acrylic and/or vinyl containing monomer and at least one hydrolytically stable silane monomer in the presence of an aqueous dispersion of at least one fluoropolymer.

The present invention further relates to a cross-linkable fluoropolymer dispersion containing a) a polymer product of at least one polymerizable acrylic and/or vinyl containing monomer and at least one hydrolytically stable silane containing monomer; b) in the presence of an aqueous dispersion of at least one fluoropolymer.

Put another way, the present invention relates to a cross-linkable fluoropolymer blend containing a) at least one acrylic resin or vinyl resin or both wherein the resin has one or more hydrolytically stable silanes or silane groups polymerized in the backbone of the resin and b) at least one thermoplastic fluoropolymer, wherein a) and b) are different.

Still another way to describe the present invention is a cross-linkable fluoropolymer blend containing a) at least one polymer containing acrylic units, vinyl units, or both and at least one hydrolytically stable silane or silane containing group; and b) at least one thermoplastic fluoropolymer, wherein a) and b) are different.

The aqueous dispersion of at least one fluoropolymer is preferably a latex of one or more polymers and preferably is a latex of copolymers. In more detail, with respect to the fluoropolymer, this fluoropolymer can be a homopolymer or other type of polymer, and can be a mixture of fluoropolymers or a mixture of fluoropolymer(s) with a non-fluoropolymer(s). Preferably, a thermoplastic fluoropolymer is used. Preferably, this fluoropolymer or mixtures of fluoropolymers can be any fluoropolymer(s) which can form a polymer blend with the other components, including other polymers present. Preferably, the fluoropolymer is a poly(vinylidene fluoride) based polymer such as a poly(vinylidene fluoride) homopolymer. Other examples of fluoropolymers include, but are not limited to, a poly(alkylene) containing at least one fluorine atom, such as polyhexafluoropropylene, polytetrafluoroethylene, poly(vinyl fluoride), or combinations thereof. More preferably, the fluoropolymer is a polymeric composition containing from about 30% to about 100 weight % of vinylidene fluoride and from 0% to about 70 weight % of at least one poly(alkylene) containing at least one fluorine atom, such as, hexafluoropropylene, tetrafluoroethylene, trifluoroethylene (VF3), and/or vinyl fluoride. Preferably, the molecular weight (MW, the sum of atomic weights of the atoms in the molecule) of the fluoropolymer which can include homopolymers, copolymers, terpolymers, oligomers, and other types of polymers is from about 80,000 MW to about 700,000 MW and, more preferably from about 100,000 MW to about 500,000 MW. The fluoropolymers can be prepared using the techniques described in U.S. Pat. Nos. 3,051,677; 3,178,399; 3,475,396; 3,857,827; and 5,093,427, all incorporated herein in their entirety by reference.

With respect to the acrylic or vinyl resins or polymers, this polymer or resin can be any conventional acrylic or vinyl resins. Examples of acrylic resins include polymers (including copolymers, terpolymers, oligomers, and the like) of acrylic acids, methacrylic acids, esters of these acids, or acrylonitrile. Acrylic resins can be formed from polymerizable vinyl containing monomers, including, but not limited to, acrylic acid alkyl esters, methacrylic acid alkyl esters, and the like. The acrylic resin can also contain other repeating units as well as combinations of different acrylic acid alkyl esters, methacrylic acid alkyl esters, acrylic acids, methacrylic acids, and acrylonitriles. For purposes of the present invention, the acrylic resin can include other polymerized monomers or can be a mixture of two or more different acrylic resins or can additionally include non-acrylic resins, such as vinyl monomers and styrenic monomers. The polymerizable vinyl monomer can also be a polysiloxane macromonomer containing at least one polymerizable functionality and at least one hindered alkoxy group.

Furthermore, the acrylic resin can optionally contain at least one ionic (e.g., sulfonate or phosphonate) or ionizable group such as a sulfonated or phosphonated group or sulfonyl groups. An ionizable group is a group capable of forming an ionic group, such as cyclic amino acids, sultones, maleic anhydride, mercaptans, sulfides, phosphalanes, and the like. These groups can be part of the acrylic resin by any means such as blending an acrylic resin in the presence of one or more monomers containing an ionic or ionizable group. In the alternative, one or more of the monomers used to form the acrylic resin can contain the ionic or ionizable group.

Besides the components mentioned above with respect to the acrylic resin, the acrylic resin can further contain or be formed in the additional presence of one or more additional monomers optionally with any type of functional group as long as these monomers are compatible with the overall formation of the acrylic resin.

As stated earlier, preferably the acrylic resin is the result of the polymerization of several monomers, wherein at least one of the monomers contains the acrylic units of the acrylic resin. More preferably, the acrylic resin is formed from polymerizing (1) acrylic acid alkyl esters, (2) methacrylic acid alkyl esters, (3) one or more co-polymerizable monomers which are different from (1) and (2), (4) one or more monomers having at least one functional group, (5) a monomer containing ionic or ionizable groups, such as a sulfonated or phosphonated monomer.

Examples of the acrylic acid ester (1) include, for example, ethyl acrylate, methyl acrylate, butyl acrylate, propyl acrylate, isobutyl acrylate, amyl acrylate, 2-ethylhexyl acrylate, hexyl acrylate, fluoroalkyl acrylates, and combinations thereof.

Examples of the methacrylic acid ester (2) include, for example, ethyl methacrylate, methyl methacrylate, butyl methacrylate, propyl methacrylate, isobutyl methacrylate, amyl methacrylate, 2-ethylhexyl methacrylate, hexyl methacrylate, fluoroalkylmethacrylate, and combinations thereof.

Examples of the copolymerizable monomers (3) include, for example, conjugated dienes (e.g., 1,3-butadiene, isoprene), aromatic alkenyl compounds (e.g., styrene, αmethylstyrene, styrene halides), divinyl hydrocarbon compounds (e.g., divinyl benzene), and combinations thereof.

Examples of the functional monomer (4) include, but are not limited to, α, β unsaturated carboxylic acids (e.g., acrylic acid, methacrylic acid, fumaric acid, crotonic acid, itaconic acid); vinyl ester compounds, amide compounds (e.g., acrylamide, methacrylamide, N-methylmethacrylamide, N-methylolmethacrylamide, N-alkylacrylamide, N-alkylacryl methamide, N-dialkyl methacrylamide, N-dialkyl acrylamide); monomers containing hydroxyl group(s) (e.g., hydroxyethyl methacrylate, hydroxyethyl acrylate, hydroxypropyl acrylate, hydroxypropyl methacrylate, diethylene glycol ethyl ether acrylate); monomers containing epoxy groups (e.g., glycidyl acrylate, glycidyl methacrylate), monomers containing silanols (e.g., γtrimethoxysilane methacrylate, γtriethoxysilane methacrylate); monomer containing aldehydes (e.g., acrolein), alkenyl cyanides (e.g., acrylonitrile, methacrylonitrile). The monomers included in (4) can be capable of crosslinking. Examples of copolymerizable monomers capable of crosslinking include isobutyl methacrylamide, glycidyl methacrylate, diethylene glycol dimethacrylate, and trimethyloxysilane methacrylate.

For some specific applications, low molecular weight copolymerizable polymers or oligomers can be used. Moreover, when a mixture of acrylic acid alkyl ester (1) and methacrylic acid alkyl ester (2) is used, their ratio could be suitably adjusted to achieve the desired properties.

In the present invention, hydrolytically stable silane or siloxane monomers are preferably polymerized either in the formation of the fluoropolymer and/or in the formation of the acrylic or vinyl polymer or resin. Thus, the hydrolytically stable silane monomer is at least polymerized with one of the polymers and thus is present in the backbone of the fluoropolymer or in the backbone of the polymer containing acrylic units, vinyl units, or both. The hydrolytically stable silane monomer used in the polymerization(s) is preferably at least one sterically hindered organosilane monomer. The amount of the hydrolytically stable silane monomers that can be used either in the first stage of polymerization used in the formation of the fluoropolymer and/or in the second stage of the polymerization of the acrylic and/or vinyl containing monomers or in both stages is at any suitable level and is preferably at a level of from about 0.1 to about 15 mol %. Preferably, the hydrolytically stable silane monomers used in the present invention will not substantially hydrolyze and preferably not hydrolyze at all in water for at least one hour at 25° C. without any catalyst present. More preferably, the hydrolytically stable silane monomers used in the present invention will not hydrolyze in water for even longer periods of time (e.g., 2, 3, or 4 or more hours). Furthermore, those skilled in the art understand the meaning of hydrolytically stable silane monomers. The following examples are merely representative of various types of hydrolytically stable silane monomers and others not specifically identified can be used as well. Examples of suitable hydrolytically stable silane monomers that can be used in the polymerization(s) include, but are not limited to, silane monomers containing at least one vinyl group, silane groups which are present as chain transfer agents or initiators; and organosilane groups having a functional group which can react with a functional side group on existing polymer chains.

Examples of the monomer containing silane groups include, but are not limited to, an alkenyl or alkenyl ether organo-silane co-monomer with or without at least one fluorine substituent. The preferably sterically hindered organo-silane co-monomer prevents or substantially prevents premature hydrolysis/condensation of the fluoropolymer blend or dispersion. In other words, the sterically hindered groups on the fluoropolymer of the present invention are such that their spatial arrangement prevents or retards a reaction with another molecule. Preferably, the sterically hindered organo-silane co-monomer can be present in any amount for purposes of the present invention. Preferably, the sterically hindered organo-silane co-monomer is present in an amount of from 0.1 mol % to about 50 mol %, more preferably from about 0.1 mol % to about 20 mol %, and most preferably from about 0.1 mol % to about 10 mol %.

Preferably, the sterically hindered organo-silane co-monomer has the formula:

$$R^2R_n^3Si(OR^1)_{3-n} \quad (I),$$

wherein n is an integer of from 0 to 2, or has the formula:

$$R^2[Si(R^3)_k(-OR^1)_{2-k}(O)]_mR^3 \quad (II),$$

wherein m is an integer of from about 2 to about 10, k is 0 or 1; and $R^1$ represents at least one $C_3$ or higher branched alkyl, cycloalkyl, or heterocyclic group with or without at least one fluorine substituent; $R^2$ represents at least one alkenyl, allyl, acrylate, or methacrylate containing group; $R^3$ represents at least one n-alkyl, at least one $C_3$ or higher branched alkyl, at least one $C_3$ or higher cycloalkyl, or heterocyclic (e.g., aromatic) group.

Preferably, $R^1$ represents at least one $C_3$–$C_6$ branched alkyl or cycloalkyl group; $R^2$ represents at least one vinyl, allyl, or vinyl ether containing group with or without at least one fluorine substituent; and/or $R^3$ represents at least one $C_1$–$C_6$ n-alkyl, $C_3$–$C_6$ branched alkyl, $C_3$–$C_6$ cycloalkyl, or $C_6$–$C_9$ aryl.

With respect to the above formulas I and II, n is preferably 0, m is preferably an integer of 2 to 5. Examples of the branched alkyl or cycloalkyl group include, but are not limited to, cyclopentyl, cyclohexyl, cycloheptyl, cyclooctyl, bicycloheptyl, iso-octyl, 3-methyl pentyl, iso-amyl, iso-pentyl, 2,5-dimethylhexyl, 4-methyl-2-pentyl, iso-propyl, iso-butyl, t-butyl, iso-pentyl, and sec-pentyl, and the like. Examples of the n-alkyl include, but are not limited to, n-butyl, n-pentyl, n-hexyl, n-heptyl, n-octyl, n-nonyl, n-decyl, and the like. Substituents to the $R^3$ group may include a replacement for a carbon atom with atoms such as oxygen, nitrogen, or sulfur, with the proviso that the carbon atom adjacent to the silicon is not replaced. Other substituents include replacement of the hydrogen atom attached to carbon with halogen atoms, nitrogen, sulfur, oxygen, and organofunctional groups, such as cyano, urea, esters, amides, oxo, and the like.

The alkenyl organo-silane co-monomers used in the present invention can further contain at least one functional group. With reference to formulas I and II, this functional group or groups are preferably present as part of the $R^3$ group. The functional group can be any group which still permits the formation of the fluoropolymer of the present invention and preferably provides the desired properties of the fluoropolymers or provides reactive sites for the fluoropolymer for subsequent modification or cross-linking. Examples of functional groups include, but are not limited to, halogens, hydroxyl, nitrogen, amino, epoxy, carboxylic salts, esters, sulfur, oxygen, cyanos, ureas, amides, oxo, and the like.

As stated earlier, the fluoropolymer can be uncross-linked or cross-linked. In addition, the fluoropolymer of the present invention can further contain at least one metal oxide, silane, siloxane, or combinations thereof. Preferably, the metal oxide, silane, or siloxane are reacted with a silane present in the fluoropolymer. Any material containing a silanol functional group may be reacted with the acrylics and/or fluoropolymer of the present invention.

The organosilane moiety that is present in the aqueous dispersion of the present invention is homogeneously distributed in the fluoropolymer matrix because it is copolymerized into a polymer wherein the polymer is compatible with and intimately mixed with the fluoropolymer. As stated earlier, the organosilane moiety can alternatively be present in the fluoropolymer by being copolymerized during the polymerization of the fluoropolymer or vinyl and/or acrylic resin, which can be the same or different, or can be present in both the fluoropolymer and in the vinyl and/or acrylic resin.

As indicated earlier, the fluoropolymer is preferably a chlorine-free fluoropolymer and thus the overall cross-linkable fluoropolymer dispersion of the present invention preferably does not contain chlorine in the polymer product or dispersion.

In preparing the cross-linkable fluoropolymer dispersions of the present invention, preferably, at least one polymerizable acrylic and/or vinyl containing monomer and at least one hydrolytically stable silane monomer are polymerized together in the presence of an aqueous dispersion of at least one fluoropolymer. As indicated earlier, the aqueous dispersion of the fluoropolymer can be formed by polymerizing fluoromonomers in the presence of a hydrolytically stable silane monomer to form a fluoro-copolymer containing the silane units. At least one polymerizable acrylic and/or vinyl containing monomer can then be polymerized in the presence of this aqueous dispersion of the fluoropolymer. In addition, the polymerizable acrylic and/or vinyl containing monomer can first be polymerized in the presence of the aqueous dispersion of the fluoropolymer and then the hydrolytically stable silane monomer can be polymerized in the presence of the aqueous dispersion of the fluoropolymer. Thus, any sequence of polymerizations can occur wherein the silane monomer used in the polymerization can be present in one or more of the polymerizations used to make the aqueous fluoropolymer dispersions of the present invention.

In more detail, and with respect to the process of making the aqueous fluoropolymer dispersions of the present invention, preferably the aqueous dispersion of the fluoropolymer is first obtained by conventional methods as described above and then a seeded emulsion polymerization of polymerizable acrylic and/or vinyl containing monomers is added to the aqueous dispersion and then a polymerization is conducted. As stated above, hydrolytically stable silane monomers can be included in either the first stage, the second stage, or both stages of the seeded emulsion polymerization, and preferably at levels of from about 0.1 to about 50 mol %. All possible variations and combinations of this multi-stage polymerization can be used to obtain the above-described aqueous fluoropolymer dispersions of the present invention.

Preferably, external and/or internal buffers are used during the polymerization of the silane monomer. An internal buffer is preferred in order to prevent the premature hydrolysis/condensation of the silane functional groups during storage. The internal buffers can be formed by incorporating monomers capable of acting as a weak acid or base into at least one of the polymer stages described above. Preferred monomers of this sort are carboxylic acids, such as acrylic acid, methacrylic acid, itaconic acid, and the like as well as salts thereof; phosphoric and phosphonic esters and salts thereof; and amine containing monomers, such as dimethyl amino ethyl(meth)acrylic, or salts thereof. Alternatively, functional groups can also be incorporated through the use of suitable initiators or transfer agents. A monomer can serve dual functions by acting as one of the polymerizable acrylic and/or vinyl containing monomers as well as also serving as the internal buffer.

In more detail, illustrative of buffering agents, are: organic and inorganic acids and bases, including salts thereof and preferably mono- or poly-alkali metal, alkaline earth metal or amine salts of carbonic acid, phosphoric acid, sulfuric acid, hydrofluoric acid, a $C_1$–$C_6$ organo-, mono-, or poly-carboxylic acid, or a $C_2$–$C_{30}$ alkyleniminopolycarboxylic acid, ammonia, a $C_1$–$C_{30}$ organic base, or a mixture of any of the foregoing. Illustrative are: sodium bicarbonate, sodium carbonate, ammonium carbonate, sodium borate, mono-, di-, or trisodium phosphate, mono-, di-, or tripotassium phosphate, ammonium sodium phosphate, mono-, or disodium sulfate, sodium acetate, potassium acetate, ammonium acetate, calcium acetate, sodium formate, mono-, or disodium sulfide, ammonia, mono-, di-, or triethylamine, mono-, di-, or triethanolamine, (ethylenedinitrilo) tetraacetic acid sodium salt (sodium E.D.T.A.), pyridine, aniline, and sodium silicate. These are only a few examples of appropriate buffering agents. Combinations of these materials with other buffers, acids, or bases, such as the use of ammonium hydroxide and acetic acid together, will also be effective.

Trisodium phosphate ($Na_3PO_4$), disodium phosphate ($Na_2HPO_4$), and ammonium hydroxide ($NH_4OH$) are preferred, but sodium bicarbonate ($NaHCO_3$) is especially preferred because it is easy to handle; it consistently gives emulsions with a pH of 7.5; it is environmentally safe; and it is inexpensive.

The amount of buffering agent to be employed can vary widely. In general, however, less than 0.01 percent may not be enough to be useful, and more than 5 percent by weight of the total composition can be uneconomical.

For purposes of the present invention, internal buffering is preferably obtained by the partial neutralization of the copolymerized acid or base, either prior to or subsequent to the polymerization step to a preferred pH range of from about 4 to about 9 and more preferably from about 6 to about 8. In many cases, the use of volatile neutralizing agents are preferred such as ammonia or low molecular weight organic amines to neutralize acids, and acetic or hydrochloric acids are used to neutralize bases.

The emulsion polymerization of the present invention can involve two or more stages. One or more types of monomers can be involved in each stage. The sterically hindered organosilane monomer can be present in one or more of the polymerization sequences. When non-functional polymers are included in the process, they can either be admixed with part or all of the fluoropolymer seed, admixed with part or all of the monomer mixture, or fed separately. When the process involves several stages, these stages can be preformed in different orders with all possible combinations being possible. For example, fluoropolymer(s) can be added totally at the beginning, and then carry out the other monomer polymerization(s). The fluoropolymer can be added partially at the beginning and then the remaining fluoropolymer material fed continuously or in batches. The fluoropolymer can be added continuously or in batches during the reaction. The emulsion polymerization using the fluoropolymer as a seed can be preformed according to standard methods such as batch polymerization where the totality of the monomer mixture is added into the aqueous fluoropolymer dispersion from the beginning, added as a semi-batch polymerization, wherein part of the monomer mixture is fed from the beginning and reacted and then the remaining polymer mixture is fed continuously or in batches, or continuous feed polymerization wherein the monomer mixture is fed continuously or in batches in the aqueous fluoropolymer dispersion during the reaction. Furthermore, the aqueous dispersion of the present invention can also be blended with a second aqueous dispersion, such as a non-fluoropolymer dispersion, which also can contain hydrolytically stable silane groups, or hydroxy groups or other groups which would be capable of cross-linking with the fluoropolymer dispersion at any point.

With respect to making the fluoropolymers of the present invention, one method can involve the following. Initially, deionized water, di-sodium phosphate, and at least one fluorinated surfactant are introduced into a reactor and then deoxygenated. Then, an initiator emulsion and an alkoxy silane solution or emulsion can be introduced with or without solvent to start a reaction in the reactor. Preferably, the reaction media is an aqueous-based media. Once the reaction has started or simultaneously with the beginning of the reaction, the co-monomers can be continuously fed into the reactor, optionally along with buffering agent(s). After reaching the desired solid level of the polymer formation, the feed of the monomers can be stopped but the charge of the initiator is preferably maintained to consume any leftover monomers present. The initiator charge can then be stopped preferably when the reactor pressure drops below about 300 psi and once the reactor is cooled. The unreacted monomers can be vented and the fluoropolymer collected through a drain port or other collection means. The polymer can then be isolated using standard isolation techniques such as, but not limited to, salts/acid coagulation, freeze-thaw, shear coagulation, or spray drying.

In more detail, with respect to the reactor temperature, any reactor temperature can be used as long as the temperature is sufficient to permit the polymerization and formation of the fluoropolymer of the present invention. Examples of suitable temperatures include, but are not limited to, from about 30 to about 120° C. and more preferably from about 60 to about 100° C.

With respect to the pressure used during polymerization, again, any pressure can be used as long as the pressure is sufficient to permit the polymerization and formation of the fluoropolymers of the present invention. Preferably, this pressure is from about 40 to about 50 atm. While it is preferred that the co-monomers are continuously fed into the reactor, the co-monomers can be introduced as a mixture or through separate feed lines or sequentially in any order.

The reactor is preferably a pressurized polymerization reactor equipped with a stirrer and heat control means. The temperature of the polymerization can very depending on the characteristics of the initiator used, but it is typically from about 30° C. to about 120° C., and most conveniently it is from about 60° C. to about 105° C. The temperature is not limited to this range, however, and might be higher or lower if a high-temperature or low-temperature initiator is used. The pressure of the polymerization is typically from about 20 to about 80 bar, but it can be higher if the equipment permits operation at higher pressure. The pressure is most conveniently from about 30 to about 60 bar.

Surfactants which can be used in the polymerization are water-soluble, halogenated surfactants, especially fluorinated surfactants such as the ammonium, substituted ammonium, quaternary ammonium, or alkali metal salts of perfluorinated or partially fluorinated alkyl carboxylates, the perfluorinated or partially fluorinated monoalkyl phosphate esters, the perfluorinated or partially fluorinated alkyl ether or polyether carboxylates, the perfluorinated or partially fluorinated alkyl sulfonates, and the perfluorinated or partially fluorinated alkyl sulfates. Some specific, but not limiting examples are the salts of the acids described in U.S. Pat. No. 2,559,752 (incorporated in its entirety by reference herein) of the formula $X(CF_2)_nCOOM$, wherein X is hydrogen or fluorine, M is an alkali metal, ammonium, substituted ammonium (e.g., alkylamine of 1 to 4 carbon atoms), or quaternary ammonium ion, and n is an integer from 6 to 20; sulfuric acid esters of polyfluoroalkanols of the formula $X(CF_2)_nCH_2OSO_3M$, where X and M are as above; and salts of the acids of the formula $CF_3(CF_2)_n(CX_2)_mSO_3M$, where X and M are as above, n is an integer from 3 to 7, and m is an integer from 0 to 2, such as in potassium perfluorooctyl sulfonate. The surfactant charge is from about 0.05% to about 5% by weight on the total monomer weight used, and most preferably the surfactant charge is from about 0.1% to about 2.0% by weight.

After the reactor has been charged with deionized water and surfactant, the reactor can be either purged with nitrogen or evacuated to remove oxygen. The reactor can be brought to temperature, and chain-transfer agent may optionally be added. The reactor is then pressurized with a mixture of fluoromonomers.

The reaction can be started and maintained by the addition of any suitable initiator known for the polymerization of fluorinated monomers including inorganic peroxides, "redox" combinations of oxidizing and reducing agents, and organic peroxides. Examples of typical inorganic peroxides are the ammonium or alkali metal salts of persulfates, which have useful activity in the 65° C. to 105° C. temperature range. "Redox" systems can operate at even lower temperatures and examples include combinations of oxidants such as hydrogen peroxide, t-butyl hydroperoxide, cumene hydroperoxide, or persulfate, and reductants such as reduced metal salts, iron (II) salts being a particular example, optionally combined with activators such as sodium formaldehyde sulfoxylate or ascorbic acid. Among the organic peroxides which can be used for the polymerization are the classes of dialkyl peroxides, peroxyesters, and peroxydicarbonates. Exemplary of dialkyl peroxides is di-t-butyl peroxide, of peroxyesters are t-butyl peroxypivalate and t-amyl peroxypivalae, and of peroxydicarbonates are di(n-propyl) peroxydicarbonate, di-isopropyl peroxydicarbonate, di(sec-butyl) peroxydicarbonate, and di(2-ethylhexyl) peroxydicarbonate. The use of di-isopropyl peroxydicarbonate for vinylidene fluoride polymerization and co-polymerization with other fluorinated monomers is taught in U.S. Pat. No. 3,475,396, and its use in making vinylidene fluoride/hexafluoropropylene copolymers is further illustrated in U.S. Pat. No. 4,360,652. The use of di(n-propyl) peroxydicarbonate in vinylidene fluoride polymerizations is described in the Published Unexamined Application (Kokai) JP 58065711. The quantity of an initiator required for polymerization is related to its activity and the temperature used for the polymerization. The total amount of initiator used can be any amount and for example can be from about 0.05% to about 2.5% by weight or higher on the total monomer weight used. Typically, sufficient initiator is added at the beginning to start the reaction and then additional initiator may be optionally added to maintain the polymerization at a convenient rate. The initiator may be added in pure form, in solution, in suspension, or in emulsion, depending upon the initiator chosen. As a particular example, peroxydicarbonates are conveniently added in the form of an aqueous emulsion.

Water-soluble inorganic per compounds, such as persulfates, perborates, percarbonates, and the like, generally in the form of their potassium, sodium or ammonium salts, can also be used as initiators for emulsion polymerization.

Depending on the polymerization temperature and the decomposition constant of the initiator, decomposition accelerators, generally reducing agents, may have to be additionally used for polymerization in cases where low temperatures are applied. Suitable decomposition accelerators are sulfur compounds, such as for example, sodium sulfite, sodium pyrosulfite or Rongalit C (sodium formamidine sulfinic acid), and also organic reducing agents, such as ascorbic acid, metal salts, such as iron (II) or cobalt (II) salts, organometallic compounds, and the like.

The reaction temperatures for the co-polymerization are in the range from −15° to +120° C., preferably in the range from 20° to 115° C., and, more preferably, in the range from 30° to 110° C.

If necessary, chain transfer agents, such as methanol, isopropanol, isopentane, ethyl acetate, diethyl malonate and carbon tetrachloride, may be used to adjust the molecular weight of the polymers formed.

The preferred pressure range for the process according to the present invention can be from 5 to 65 bar.

As indicated above, the co-polymers according to the present invention may be produced in batches, although they are preferably produced semi-continuously or continuously. Generally, the time for polymerization to be completed is based on the amount of co-monomers present, initiator amounts, and reactor conditions. Preferably, the time for the polymerization to be completed is when the desired solids content is achieved.

Preferably, the collected fluoropolymers of the present invention can be formed into a powder and any unreacted co-monomers can be further removed by washings, for instance, with methanol or other suitable solvents.

The seed polymerization may be carried out under the same conditions as are conventionally used for conventional emulsion polymerizations of acrylic and like monomers. A surfactant, a polymerization initiator, a chain transfer agent, a pH regulator and, optionally, solvent and chelating agents are combined with the seed latex and, after purging to remove molecular oxygen, the reaction is preferably carried out under an inert atmosphere at atmospheric pressure, from 0.5 to 6 hours at temperatures of from about 20° C. to about 90° C., preferably from about 40° C. to about 80° C.

The reaction itself, using the fluoropolymer as a seed, may be performed according to any of the standard techniques known in the art for this type of reaction, such as, batch polymerization, wherein the totality of the monomer mixture is added into the fluoropolymer dispersion at the beginning of the reaction; semi-continuous polymerization, wherein part of the monomer mixture is added at the beginning of the reaction and then the remainder is fed continuously or in batches during the course of the reaction and continuous polymerization, wherein the monomer mixture is fed continuously throughout the course of the reaction.

It is also possible to perform the emulsion polymerization in one or more stages. If multi-stages are employed, each stage may contain the same monomers, surfactant, polymerization initiator, chain transfer agent, pH regulator, optional solvent and optional chelating agent as described above for the single stage process, or one or more of the ingredients may be varied, based on known principals from the art, from state to state depending on the desired morphology of the final particles of the latex formed during the reaction. The final latex particle may be composed of one, two, or more phases, in addition to the innermost fluoropolymer phase, of various geometries, such as homogeneous particle, core-shell, incomplete core-shell, inverse core-shell, half-moon, strawberry, interpenetrating network and the like. All these geometries and morphology are well known in the art as are the techniques for preparing them. Any particular geometry and/or morphology is not contemplated as a critical limitation by the present invention, but the preferred morphology is homogeneous particle.

As the emulsifier, an anionic emulsifier, a nonionic emulsifier or a combination thereof may be used. In some cases an amphoteric or cationic surfactant may be employed. As the anionic surfactant, one may employ for example, a sodium salt of a sulfuric acid ester of a higher alcohol, a sodium alkyl benzene sulfonate, a sodium salt of a dialkyl succinate sulfonic acid and a sodium salt of an alkyldiphenylether sulfonic acid. Of these, preferred are sodium alkyl benzene sulfonate, sodium lauryl sulfate, a polyoxethylene alkyl (or alkylphenyl) ether sulfonate and the like. As the nonionic emulsifier, one may employ, for example, polyoxyethylenealkyl ethers and polyoxethylenealkyl aryl ethers. Preferred are a polyoxyethylene nonylphenyl ether, polyoxyethylene octylphenyl ether and the like. As the amphoteric emulsifier lauryl betaine and the like are suitable. As the cationic surfactant, one may employ, for example, an alkyl peridinium chloride, an alkyl ammonium chloride and the like. Also, emulsifiers copolymerizable with the monomers may be employed, such as, for example, sodium styrene sulfonate, sodium alkyl aryl sulfonate and the like.

The amount of surfactant or emulsifier used is normally from about 0.05 to about 5 parts by weight per 100 parts by weight, for instance, of the total of the vinylidene fluoride polymer particles and the monomer mixture.

As the polymerization initiator, any known water and oil soluble free radical sources for initiation of ethylenic polymerization may be employed.

As water soluble initiators, for example, one may employ a water soluble persulfonic acid salt and hydrogen peroxide. In some cases the polymerization initiator may be employed in combination with a reducing agent. Suitable reducing agents include, for example, sodium pyrosulfite, sodium hydrogen sulfite, sodium thiosulphate, L-ascorbic acid and its salts and sodium fomaldehyde sulfoxylate. Oil soluble initiators, optionally dissolved in the monomer mixture or a solvent, include organic peroxides and azo initiators. Typical examples of these compounds are 2, 2'-azobisisobutronitrile, 2,2'azobis-(4-methoxy-2,4-dimethylvaleronitrile), 2,2'-azobis 2,4-dimethylvaleronitrile, 1'-azobis-cyclohexane-1-carbo-nitrile, benzoyl peroxide, dibutyl peroxide, cumene hydroperoxide, isopropyl benzene hydroperoxide, p-methane hydroperoxide, t-butylperoxy-(2-ethyl hexanoate), succinic acid peroxide, and diacyl peroxides in general, peroxy dicarbonates and peroxymonocarbonates in general and peroxyesters in general including the t-amyl peroxyesters which have found use in assuring low residual monomer content. T-amyl hydroperoxide is also useful. Mixtures of initiators may also be used. Preferred initiators are: cumene hydroperoxide, isopropyl benzene hydroperoxide, ammonium persulfate, p-methane hydroperoxide, 2,2'-azobisisobutylonitrile, benzoyl peroxide, t-butyl hydroperoxide, 3,5,5-trimethylhexanolperoxide and t-butyl-peroxy-(2-ethyl hexanote). The amount of the polymerization initiator used may be from about 0.1 to about 3 parts by weight of the monomer mixture.

Use of known chain transfer agents is contemplated. Such materials include, for example, halogenated hydrocarbons, such as carbon tetrachloride, chloroform, bromo form and the like, mercaptans, such as n-dodecyl mercaptan, t-dodecyl mercaptan, n-octyl mercaptan and the like, xanthogens, such as dimethylxanthogen, diisopropyl xanthogen disulfide and the like and terpenes, such as dipentenes terpinolene and the like. The amount of chain transfer agent is, preferably, from about 0 to about 10 parts of weight of the monomer mixture.

The chelating agent includes, for example, glycine, alanine, and ethylene diamine tetra acetic acid and the pH adjusting agent includes, for example, sodium carbonate, potassium carbonate and sodium hydrogen-carbonate. The amounts of chelating agent and pH adjusting agent used are from about 0 to about 0.1 part by weight and about 0 to about 3 parts by weight of the monomer mixture, respectively.

A small quantity of solvent may be added during the reaction to help swell the seed polymer. Typically, for example, these solvents may include methyl ethyl ketone, acetone, trichlorofluoroethane, methyl isobutyl ketone, dimethyl sulfoxide, toluene, dibutyl phthalate, methyl pyrrolidone, ethyl acetate and the like in such small amounts that the operability, safety against fire hazard, environmental safety and production safety are not impaired. The amount of solvent used is from about 0 to about 20 parts by weight per 100 parts by weight of the monomer mixture.

The final fluoropolymer particle size can affect the properties of the latex resulting from the synthesis reactions and of coatings prepared from the particles. The particle size can range from about 50 or lower to 400 nm (nanometers) or higher with 50 to 200 nm being preferred.

Additional amounts of surfactants and/or pH adjusting agents may, if desired, be added to the final latex to improve its storage stability and/or reactivity.

The Tg (glass transition temperature) of the final fluoropolymer can be set by appropriately selecting a seed fluoropolymer particle with an appropriate Tg and a monomer mixture providing a known Tg for the acrylic phase according to the rule generally used for compatible resin systems. See: "Emulsion Polymerization and Emulsion Polymers", Chapter 9 and 18, P. Lovell and M. ElAsser (authors), J. Wiley, Ed. 1997, incorporated in its entirety by reference herein.

The fluoropolymer of the present invention may be used to formulate baking or drying paint, cationic electro-disposition paint, fiber treatment agent, paper processing agent, floor coating, carpet backing, water and oil repellant treatment agents, non-adhesive treatment agent and protective surface coatings.

The fluoropolymer dispersions formed by the processes of the invention may be used "as is" or formulated as an aqueous emulsion-type paint by adding such typical paint additives as pigments, dispersing agents, thickeners, defoaming gents, anti-freezing agents and film forming agents. One of skill in the art will readily be able to adjust the proportions of these additives to optimize the desired properties of the paints and the films formed therefrom.

As shown in the examples and in contrast to previous technologies, which involve admixing a silicon-containing component with a fluoropolymer, the organosilane moiety in the present invention is homogeneously distributed in the fluoropolymer matrix because it is copolymerized into a polymer which is compatible with, and intimately mixed with, the fluoropolymer. In addition, the kinetics of the silane cross-linking are preferably controlled due to the use of hindered silanes to avoid premature cross-linking which is especially effective when used with an internal buffer as described above. Consequently, silane cross-linking does not take place until the desired point in the application process (e.g., prior to, during, and/or after film formation).

In general, cross-linked coatings exhibit superior properties in terms of solvent resistance, mechanical properties, and durability in comparison to non-crossed-linked coatings. Organosilane groups in particular tend to provide improvements in terms of adhesion, water repellency, weatherability, and durability which is achieved by way of the present invention which prevents premature cross-linking. Besides paints and coating applications which can be achieved from the latex or using solid polymer isolated from the latex or powder coatings, the polymer of the present invention can also be used in other applications, including, but not limited to, multi-layer spin casing; optical coatings with unique properties such as low glare; powder coatings, injection molding; extrusion; and caulks and adhesives.

Furthermore, catalyst-free formulations, with storageability at a pH of about 7, can be obtained for formulations being coated on cementitious substrates or other basic substrates. In such a use, the substrate would raise the pH to the point of hydrolysis and cross-linking would be initiated. This use of the polymers of the present invention would be useful in making stable one-pack coatings (pigmented or clear) for such uses as concrete, roof tiles, fiber cement, stucco, outdoor concrete structures, and the like. In addition, the present invention can be triggered into cross-linking by using an appropriate acid or base on the substrate or using a substrate that already has acidic or basic properties as part of the substrate. For instance, a silane functional material could be applied directly to an acidic substrate, such as wood. For either an acid or alkaline trigger, a dilute solution of acid or base (such as a fugitive acid like acetic acid or a latent acid that only become active when a blocking neutralizer is released) could be sprayed on a coating that is in the process of coalescing and which therefore still maintains some porosity. Acid triggers would be preferred with such substrates as wood.

When a multi stage process issues, the final latex particle may be composed of one, two, or more phases of various geometries, such as homogeneous particles, core-shell, incomplete core-shell, inverse core-shell, half-moon, raspberry, interpenetrating networks, and the like.

The present invention will be further clarified by the following examples, which are intended to be purely exemplary of the present invention.

EXAMPLE 1

Raw materials: The fluoropolymer seed latex (Atofina Chemicals), monomers (Aldrich, Osi Specialities, Gelest Inc), initiators (Aldrich, DuPont), Chain transfer agents (Aldrich, Evens Chemetics), surfactants (Aldrich, Osi Specialities) and buffers (Aldrich) were used without further purification.

Precharge, purge : Vazo 52 (2,2'-azobis(2,4-dimethyl pentane nitrite) 0.3 g, sodium lauryl sulfate 1 g, Silwet L-7607 (polyalkyleneoxide modified polymethylsiloxane) 0.4 g, and seed latex (VF2/HFP, 28 wt % solids) 400 g, were precharged in a 500 ml four neck kettle fitted with a condenser, high purity argon and monomer inlets, and a mechanical stirrer. pH of the mixture was adjusted to neutral by adding few drops of diluted $NH_4OH$.

Reaction period: The reactor was heated up to 65° C. and the monomer mixture [(Methyl Methacrylate (MMA) 34 g, Ethyl Acrylate (EA) 12 g, and Methacryloylpropyl tris (methoxy) silane (MAPTMS) 2 g,] and a chain transfer agent (Isooctyl Mercaptopropionate (IOMP)) 0.3 g was fed by using a syringe pump. Optionally a part of monomer mixture can be added in the precharge, prior to the reaction period. When the feeding was over, the residual monomer was polymerized by maintaining the reaction temperature and agitation for 120 minutes. Then the medium was cooled down to room temperature, vented, and the final latex was filtered through a cheese cloth. The final solids content was 35 wt %, with a coagulum-free latex.

In Run #4–6, NaHCO$_3$ buffer was used to bring the pH above 5. In run #4, the MAPTMS was added at a later time. In Run #5, a Redox initiation was used and the temperature was kept below 50° C.

In all the tables, the quantities of monomer and seed particles are given in parts by weight, unless otherwise specified. Table 1 below gives representative synthetic data of fluoropolymer latex containing non-hindered organosilane monomers with various fluoropolymer seed and acrylic composition:

temperature when monomers bearing unhindered alkoxysilane functional group such as MAPTMS were copolymerized. As a result, latex powders were not soluble in active solvents such as THF, NMP, and TEP.

EXAMPLE 2

Using the same or similar conditions as in Example 1, except for the starting materials, examples of the present invention were prepared. The materials and results are set forth in Table 2 below which gives representative synthetic data of latex containing sterically hindered organosilane monomer with various fluoropolymer seed and acrylic composition.

| Sample # | Fluropolymer Seed | | Acrylic Polymerization | Silane monomer/total | Solid | Particle |
|---|---|---|---|---|---|---|
| | VF2 (wt %) | HFP (wt %) | Acrylic composition (wt %) | solid (wt %) | Content (%) | Size (nm) |
| 7 | 88–90 | 10–12 | MMA/EA/MAPTIS 63/33/4 | 1.3 | 45 | 133 |
| 8 | 88–90 | 10–12 | MMA/EA/MAPTIS 64/30/6 | 1.8 | 43 | 136 |
| 9 | 81 | 19 | MMA/EA/MAPTIS 70/25/5 | 1.7 | 37 | 78 |
| 10 | 71 | 29 | MMA/EA/MAPTIS 71/25/4 | 1.3 | 33 | 71 |
| 11 | 71 | 29 | MMA/EA/MAPTIS 70/25/5 | 1.5 | 34 | 71 |
| 12 | 71 | 29 | MMA/MAPTIS 96/4 | 1.3 | 33 | 70 |
| 13 | 71 | 29 | MMA/MAPTIS 92/8 | 2.7 | 34 | 72 |
| 14 | 66 | 34 | MMA/EA/MAPTIS 70/25/5 | 1.7 | 38 | 84 |

MMA: Methyl Methacrylate
EA: Ethyl Acrylate
MAPTIS: Methacryloyl propyl tris(isopropoxy)silane

| Run # | Fluropolymer Seed | | Acrylic Polymerization | Silane Content | Solid Content |
|---|---|---|---|---|---|
| | VF2 (wt %) | HFP (wt %) | Acrylic composition (wt %) | (wt %) | (%) |
| 1 | 100 | 0 | MMA/EA/MAPTMS 69/30/1 | 0.3 | 44 |
| 2 | 100 | 0 | MMA/EA/MAPTMS 59/26/15 | 4.5 | 46 |
| 3 | 100 | 0 | MMA/EA/MAA/MAPTMS 68/28/2/2 | 0.6 | 48 |
| 4 | 100 | 0 | MMA/EA/MAPTMS 71/28/1 | 0.3 | 40 |
| 5 | 100 | 0 | MMA/EA/MAPTMS 66/33/1 | 0.3 | 42 |
| 6 | 81 | 19 | MMA/EA/MAA/MAPDES 67/24/4/5 | 1.6 | 37 |

MMA: Methyl Methacrylate
EA: Ethyl Acrylate
MAA: Methacrylic Acid
MAPTMS: Methacryloyl Propyl Tris(methoxy)Silane
MAPDES: Methacryloyl Propyl Methyl Bis(ethoxy)Silane Whatever the reaction conditions, the latex particles were crosslinked during synthesis or less than 24 h at room When hindered organosilane monomers like MAPTIS (Examples 7–14) were incorporated into the polymer backbone, no crosslinking was noticed during synthesis and up to 2–3 weeks storage at room temperature. The latexes were soluble in acetone (centrifugation/filtration) within that period and can be crosslinked during film formation upon heating. Because of the presence of unreacted alkoxysilane functional groups, the glass adhesion was excellent within that period (boiling water tests and cross-hatch) even at very low silane content (<1.3 wt %). After 1 month storage at room temperature a pH drift (acidic) was observed and the latexes become insoluble in acetone.

These compositions may be used for powder coatings and the like and dry powders recovered from the latex after the synthesis preferably retain their crosslinkability for very long period. Coatings may be obtained by the conventional techniques.

As shown in Table 1, no significant improvement was noticed when: a lower level of silane monomer was copolymerized (entries 1, 4, and 5); a carboxylic acid functional groups was incorporated into the polymer backbone (entries 3, 6); a less reactive di-alkoxysilane monomer was copolymerized (entry 6); an external buffer was introduced to maintain a neutral pH (entries 4–6); a delayed addition strategy was used (entry 4); or a lower polymerization temperature with a redox initior system was employed (entry 5). Thus, the use of unhindered organosilane monomers like MAPTMS (Methacryloyl Propyl Tris(methoxy)Silane), MAPTES (Methacryloyl Propyl Tris(ethoxy)Silane) and MAPDES (Methacryloyl Propyl Methyl Bis(ethoxy)Silane) as well as other factors led to premature crosslinking taking place during synthesis or after short term storage at room temperature.

EXAMPLE 3

Several of the products were then subjected to an adhesion test and compared to a control wherein the control was not containing a silane monomer. Table 3 below reports the results of the adhesion test (boiling water-98° C.) of baked latex films (12 hours, 110–120° C.) cast on glass without formulation:

| Sample # (test) | Time | Weight before soak | Weight after soak and dry | Retention (%) |
|---|---|---|---|---|
| 10 | 4 h 15 mins | 9.43 | 9.44 | 100 |
| 16 (Control) | 5 mins | 9.47 | 0 | 0 |
| 12 | 1 h 45 mins | 9.53 | 9.58 | 100 |
|  | 3 h 35 mins |  | 9.56 |  |
| 9 | 5 h | 9.65 | 9.65 | 100 |

Samples were then tested as coatings. Table 4 below reports the results of the coating evaluation of the silane latexes without carboxylic acid functionality. The latexes are prepared from various fluoropolymer seed latexes (baked 2

In all the tables, the quantities of monomer and seed particles are given in parts by weight, unless otherwise h/150° C.).

| Sample # (test) | MFFT (° C.) | X-hatch adhesion | X-hatch adhesion after 1 h boiling H2O | Gloss (20°/60°/85°) | Pencil hardness glass-Al | Koning hardness |
|---|---|---|---|---|---|---|
| 10 | 17 | 0 | — | 48/76/92 | B-2H | — |
| 11 | 17 | 100 | 100 | 12/48/63 | B-2H | 64 |
| 16 (Control) | 17 | 0 | — | 44/77/91 | 2H | 41 |
| 9 | 29 | 100 | 100 | 45/73/87 | F-3H | — |
| 14 | 23 | 100 | 100 | 25/63/78 | F-2H | 69 |

EXAMPLE 4

Using the same or similar conditions as in Ex. 1, additional examples were prepared. The results are set forth in Table 5 which gives representative synthetic data of latex containing sterically hindered organosilane and methacrylic acid monomers with various fluoropolymer seed and B-44 type acrylic composition.

| Sample # | Fluoropolymer Seed | | Acrylic Polymerization | Silane monomer/ total | Solid Content |
|---|---|---|---|---|---|
| | VF2 (wt %) | HFP (wt %) | Acrylic composition (wt %) | solid (wt %) | tent (%) |
| 15 | 86 | 14 | MMA/EA/MAA 62/31/7 | — | 42.5 |
| 16 | 86 | 14 | MMA/EA/MAA 64.5/32/3.5 | — | 46.5 |
| 17 | 92 | 8 | MMA/EA/MAA/MAPTIS 67/24/4/5 | 1.6 | 46 |
| 18 | 92 | 8 | MMA/EA/MAA/MAPTIS 67/24/4/5 | 1.4 | 37 |
| 19 | 81 | 19 | MMA/EA/MAA/MAPTIS 67/24/4/5 | 1.5 | 37 |
| 20 | 81 | 19 | MMA/EA/MAA/MAPTIS 67/24/4/5 | 4.6 | 37 |
| 21 | 81 | 19 | MMA/EA/MAA/VTIS 67/24/4/5 | 4.7 | 38 |
| 22 | 86 | 14 | MMA/EA/MAA/MAPTIS 61.5/33.5/2.5/2.5 | 0.7 | 48.5 |

MMA: Methyl Methacrylate
EA: Ethyl Acrylate
MAA: Methacrylic Acid
MAPTIS: Methacryloyl Propyl Tris(isopropoxy)Silane
VTIS: Vinyl Tris(isopropoxy)Silane When hindered organosilane monomers like MAPTIS and Methacrylic Acid (MAA) acting as internal buffer were incorporated into the polymer backbone, no crosslinking was noticed during synthesis and up to 3 months storage at room temperature. As a result, no pH drift was noticed, and the latexes remained soluble in acetone and the glass adhesion of the 3 months aged latex was the same as the fresh latex. These compositions are more preferred for one-pack waterborne crosslinkable latex.

Table 6A below shows the effect of curing on crosslinking level, using Sample 19 from Table 5 formulated with no added catalyst. The scale of "pencil hardness" is: 1<soft<6, 6<intermediate<10, 10<hard<14

| | cross hatch adhesion (%) | pencil hardness |
|---|---|---|
| 15 hrs @ 125° C. | 53 | 10 |
| 2 hrs @ 150° C. | 100 | 11 |

Table 6 B below shows the effect of formulation on coating properties. The silane containing latex used for all these formulations was Sample 22. Sample 23 was made with Sample 16. Sample 24 was made with Sample 15. The formulations of the coatings were developed from the raw latex as identified above. The following formulation components were added using a propeller blade-type mixer, each additive being adjusted according to solids content and latex viscosity: Surfactant: 2 wt % on solids, Triton X-405

(Octylphenoxypolyethoxyethanol); Ammonia (7 wt % in water) to adjust the pH; Coalescing agent: 10–15 wt % —DPM (Dipropylene Glycol Methyl Ether); Texanol (2,2,4-trimethylpentanediol monobutyrate); Thickener: (Acrysol RM-825 (polyurethane resin, diethylene glycol monobutyl ether, and water), from Rohm & Haas), 0.1 to 3 wt % on solids; and Wetting agent: (BYK 346, polyether modified dimethyl polysiloxane), 0.1 to 2 wt % on solids. The films were cast on black leneta paper to determine if there were any defects. The formulations were then applied to different substrates with a draw down applicator. These substrates were glass or non-treated aluminum or chromated aluminum panel. For crosslinking or the catalyst system, the drawn downs were done within 3 hours after the addition of the crosslinker. The panels were cured at ambient temperature (or additionally cured with heat when required) and properties were measured after at least two weeks aging. The catalysts used were FASCAT® 4224 (Organotin mercaptide) from Atofina and AMP-95 (2-amino 2-methyl 1 propanol) from Angus Chemical. In the table, D=dissolved.

| Sample # | comments | treatment | MEK Swelling ratio | MEK soluble fraction | THF Swelling ratio | THF soluble fraction | konig hardness (Seconds) | pencil hardness | strain @ break (%) |
|---|---|---|---|---|---|---|---|---|---|
| 23 | Control, no silane | 30 mn @ 100 C. | D | D | D | D | 110 | — | 10 |
| 24 | Control, no silane | 20 mn @ 120 C. | D | D | D | D | 116 | — | — |
| 22A | neutralized, DPM | 40 mn @ 120 C. | 2.12 | 29 | 4.11 | 20.6 | 120 | F | 16 |
| 22B | 22A + Fascat 4224 | 15 mn @ 120 C. | 4.9 | 20 | 4.8 | 26 | 115 | B | 14 |
| 22C | 22A + AMP-95 | 15 mn @ 120 C. | 2.3 | 37 | 2.7 | 41 | 116 | F | 9.8 |

As can be seen in Table 6B, the coatings made from the compositions of the present invention had higher solvent resistance (no dissolution).

What is claimed is:

1. A cross-linkable fluoropolymer blend comprising:
   a) at least one acrylic resin or vinyl resin, or both,
   b) at least one thermoplastic fluoropolymer, wherein a) and b) are different, wherein at least one sterically hindered silane or silane group is polymerized in the backbone of a) alone.

2. The polymer blend of claim 1, wherein said at least one thermoplastic fluoropolymer is uniformly distributed throughout said cross-linkable fluoropolymer blend.

3. The polymer blend of claim 1, wherein said at least one thermoplastic fluoropolymer is a copolymer.

4. The polymer blend of claim 1, wherein said fluoropolymer comprises poly(vinylidene fluoride).

5. A cross-linkable fluoropolymer blend comprising:
   a) at least one acrylic resin or vinyl resin, or both,
   b) at least one thermoplastic fluoropolymer, wherein a) and b) are different, wherein at least one sterically hindered silane or silane group is polymerized in the backbone of a), b), or both, wherein said acrylic resin or vinyl resin is fluorinated.

6. The polymer blend of claim 1, wherein said acrylic resin or vinyl resin is a copolymer.

7. The polymer blend of claim 1, wherein said fluoropolymer is a homopolymer.

8. The polymer blend of claim 1, wherein said fluoropolymer is a mixture of a fluoropolymer with a non-fluoropolymer.

9. The polymer blend of claim 1, wherein said polymer product includes a functional monomer.

10. The polymer blend of claim 1, wherein said sterically hindered silane monomer is a silane monomer containing at least one vinyl group, a silane group present as a chain transfer agent or initiator, an organosilane group having a functional group which can react with a functional side group on an existing polymer chain, or combinations thereof.

11. The cross-linkable fluoropolymer blend of claim 5, wherein said:
   at least one thermoplastic fluoropolymer has an organosilane moiety.

12. A method of preparing a cross-linkable fluoropolymer dispersion comprising polymerizing at least one polymerizable acrylic and/or vinyl containing monomer and at least one sterically hindered silane monomer in the presence of an aqueous dispersion of at least one fluoropolymer.

13. A method of making a cross-linkable fluoropolymer dispersion comprising polymerizing at least one fluoromonomer in the presence of a sterically hindered silane monomer to form a fluoropolymer containing silane units and polymerizing at least one acrylic and/or vinyl containing monomer in the presence of the fluoropolymer dispersion.

14. A paint comprising the cross-linkable fluoropolymer blend of claim 1.

15. A coating formulation comprising the cross-linkable fluoropolymer blend of claim 1.

16. A cross-linked fluoropolymer resulting from cross-linking said cross-linkable fluoropolymer blend of claim 1.

17. The cross-linkable fluoropolymer blend of claim 1, further comprising at least one internal buffer.

18. A The cross-linkable fluoropolymer blend of claim 1:
   wherein said cross-linkable fluoropolymer blend is storage stable for at least three months at room temperature in an aqueous dispersion.

19. The cross-linkable fluoropolymer blend of claim 1, wherein said sterically hindered silane containing group is a sterically hindered organo-silane monomer.

20. The cross-linkable fluoropolymer blend of claim 1, wherein said sterically hindered silane or silane group has the formula:

$$R^2R_n^3Si(OR^1)_{3-n} \quad (I),$$

wherein n is an integer of from 0 to 2, or has the formula:

$$R^2[Si(R^3)_k(-OR^1)_{2-k}(O)]_mR^3 \quad (II),$$

wherein m is an integer of from about 2 to about 10; k is an integer of from 0 to 1; and $R^1$ represents at least one $C_3$ or higher branched alkyl, cycloalkyl, or heterocyclic group with or without at least one fluorine substituent; $R^2$ represents at least one alkenyl or ally, acrylate, or methacrylate containing group; $R^3$ represents at least one n-alkyl, $C^3$ or higher branched alkyl, cycloalkyl, or heterocyclic group.

* * * * *